(12) United States Patent
MacFadyen et al.

(10) Patent No.: US 8,956,163 B2
(45) Date of Patent: Feb. 17, 2015

(54) APPARATUS, SYSTEMS, AND METHODS FOR APPLYING SPIN-ART TO FABRIC

(75) Inventors: David Jerry MacFadyen, Monrovia, MD (US); Donald James MacFadyen, Monrovia, MD (US)

(73) Assignee: Spin-T, LLC, Frederick, MD (US)

( * ) Notice: Subject to any disclaimer, the term of this patent is extended or adjusted under 35 U.S.C. 154(b) by 417 days.

(21) Appl. No.: 12/776,165

(22) Filed: May 7, 2010

(65) Prior Publication Data
US 2010/0285430 A1 Nov. 11, 2010

Related U.S. Application Data

(60) Provisional application No. 61/176,705, filed on May 8, 2009.

(51) Int. Cl.
*G09B 11/00* (2006.01)
*B05C 13/00* (2006.01)
*B05C 11/02* (2006.01)

(52) U.S. Cl.
CPC .................................... *G09B 11/00* (2013.01)
USPC ............................................. 434/84; 118/52

(58) Field of Classification Search
USPC .................. 434/81, 84, 95, 101, 395; 141/34; 118/52
See application file for complete search history.

(56) References Cited

U.S. PATENT DOCUMENTS

| | | | | |
|---|---|---|---|---|
| 2,557,348 | A * | 6/1951 | Hornbostel | 118/506 |
| 3,280,792 | A * | 10/1966 | Heyde | 118/52 |
| 3,847,116 | A * | 11/1974 | Prichard | 118/52 |
| 4,550,679 | A * | 11/1985 | Pipa et al. | 118/52 |
| 4,998,471 | A * | 3/1991 | Harrington | 101/126 |
| 5,147,681 | A * | 9/1992 | Maroney | 427/514 |
| 5,242,496 | A * | 9/1993 | Handy | 118/52 |
| 5,553,643 | A * | 9/1996 | Goldfarb et al. | 141/34 |
| 5,672,057 | A * | 9/1997 | Engel | 434/84 |
| 5,722,191 | A * | 3/1998 | Morgan | 38/102.2 |
| 2006/0170157 | A1 * | 8/2006 | Weingard et al. | 273/236 |
| 2006/0207499 | A1 * | 9/2006 | Rogers et al. | 118/323 |

* cited by examiner

*Primary Examiner* — Gene Kim
*Assistant Examiner* — Alyssa Hylinski
(74) *Attorney, Agent, or Firm* — Miles & Stockbridge P.C.; David Schaffer

(57) ABSTRACT

A system, apparatus, and method for creating designs on an underlying material by spinning a platform on which the material is positioned while applying a coloring agent on the material through an aperture in an upper surface of a casing that houses the spinning platform.

20 Claims, 17 Drawing Sheets

APPARATUS, SYSTEMS, AND METHODS FOR APPLYING SPIN-ART TO FABRIC

CROSS-REFERENCE TO RELATED APPLICATIONS

This application claims the benefit of U.S. Provisional Application No. 61/176,705, filed on May 8, 2009, which is incorporated herein in its entirety.

BACKGROUND OF THE INVENTION

The present invention relates generally to painting devices, systems and methods, and more particularly to spin-art devices, systems and methods. Spin-art generally refers to depositing radial paint patterns on a material surface. To produce spin-art, a platform on which the material is deposited is spun so that the paint, which is applied on a surface of the material, radially spreads across the material surface under the action of a centrifugal force.

SUMMARY

In various embodiments a system and method for creating different design patterns on a fabric by applying paint to the fabric while the fabric is spun in a spinning assembly is disclosed.

In various embodiments a method and apparatus for creating wearable art on articles of clothing is disclosed.

In various embodiments a spinning mechanism for creating spin art on articles of clothing is disclosed.

In various embodiments a device for creating art work on a material such as, but not limited to, a fabric, for example, the device including a base frame having a plurality of leg members, a housing coupled with the base frame and including an opening in an upper portion thereof, a lid-type member attached to the housing so as to be actuable between an open position and a closed position, and a rotatable carrier member attached to the base frame and configured to engage, through the opening in the upper portion of the housing, a platform on which the material, such as, but not limited to a fabric, is mounted, and to spin the platform holding the material about a spinning axis to allow a coloring agent applied to the material, such as but not limited to fabric to spread under the action of a centrifugal force is disclosed.

In various embodiments, the lid-type member can include a generally cylindrical portion with an opening therethrough so that the coloring agent can be applied to the material through the opening when the lid-type member is in the closed position.

In various embodiments the lid-type member has a shape that can contain the coloring agent (e.g., paint) to an inside of the device during spinning.

In various embodiments the device can further include a rotating mechanism to rotate the carrier member. The rotating mechanism can be a motor located within the housing and connected to a power outlet housed outside of the housing or to a battery positioned inside or outside the housing.

In various embodiments the spinning device can include a switch to activate the motor, the switch being positioned on the housing by an external cord (hand-held or foot-pedal switch, for example) so that a user can turn the motor on and off from the outside.

In various embodiments the rotatable carrier member includes a driving shaft connected to the motor.

In various embodiments a substantially circular plate-like member, such as, a fastening plate, can be attached to the driving shaft to receive the material holding platform. The platform can include a substantially disc-like saucer and a plunger plate.

In various embodiments the spinning device is used to create a design pattern on a material which is used for an article of clothing, such as but not limited to, T-shirts, caps, pants, skirts, etc.

In various embodiments the spinning device can further include a drying mechanism to dry the coloring agent after the spinning is done and the design is created on the material. The drying mechanism can include one of an ultraviolet (UV) energy source or an infrared (IR) energy source located adjacent, on, or within the housing and positioned so as to illuminate the material having the design pattern with UV and IR energy (UV or IR light, for example), respectively.

In various embodiments one or more UV or IR energy sources (light sources for example) are positioned on an inner side portion of the lid-like member so that when the lid-portion is in an open position, UV or IR light can illuminate the design pattern on the painted material.

In various embodiments the one or more UV or IR light sources are positioned around an inner portion of a cylindrical section of the lid-like member, so that UV or IR light can cure the design on the material when the lid-like member is in a closed position.

In various other embodiments, the drying mechanism can be located outside of the spinning device and can include one or more drying cords on which the material is hung after it is removed from the holding platform.

In various embodiments a system for creating spin art on a material is disclosed. The system can include a base member including a plurality of leg members, a housing attached to the base member, the housing including a mounting bracket on an upper surface thereof, a lid pivotably mounted to the mounting bracket and configured to be pivoted between an open position and a closed position, the lid having a substantially cylindrical portion with an opening therethrough so as to expose a material holding device on which the material is mounted when the lid is in the closed position, a rotatable carrier member attached to the base member and configured to engage, through the opening in the upper portion of the housing, the material holding device and to spin the material holding device about a spinning axis to allow a coloring agent applied to the material to spread under the action of a centrifugal force during spinning, and a drying device to dry the coloring agent on the material.

In various embodiments the coloring agent, for example, but not limited to, paint, is applied to the material through the opening in the lid.

In various embodiments the lid member is shaped to shield a user from being splashed with the coloring agent during spinning.

In various embodiments the system can further include a rotating device to rotate the carrier member, the rotating device including a motor located within the housing, the rotor being connected to an external power outlet or to a battery received within or external to the housing.

In various embodiments the rotatable carrier member includes a drive shaft connected to the motor. A substantially circular plate-like fastening member can be attached to the drive shaft to receive the material holding device. The material holding device can include a substantially disc-like platform, for example, but not limited to, a saucer, over which the material is stretched and a substantially plate-like platform, for example, but not limited to, a plunger plate, that holds the material in place and connects the saucer to the rotating shaft.

In various embodiments the plunger plate can include finger-like spiral members that act like springs to clamp the material in place. The finger-like spiral elements also apply pressure to the inside of the saucer to provide friction between the saucer and the plunger plate so that the saucer and the plunger plate together provide a secure holding mechanism for the material and so that the saucer and the plunger plate rotate together as one unit during spinning.

In various embodiments a surface of the disc-like platform (saucer) includes a friction enhancing element, such as but not limited to, Velcro (trademark) strips to enhance the friction between the plate-like platform (plunger plate) and the saucer and to keep the saucer from detaching (climbing off, moving away) from the plunger plate during spinning. Various other friction enhancing elements can be used, including adding detents to the surface of the saucer, to increase friction between the saucer and the plunger plate.

In various embodiments the material is a material used for an article of clothing, such as, but not limited to, T-shirts, caps, pants, skirts, other headgear, etc.

In various embodiments the drying device includes one of a UV light source and an infrared IR light source received within, on, or adjacent the housing and positioned so as to illuminate the paint on the material with UV and IR light, respectively.

In other embodiments the drying device can include a drying cord located outside of the spinning system.

In various embodiments a method of creating a design on a material by spreading a coloring agent applied to the material under the action of a centrifugal force is disclosed. The method can include the steps of positioning the material on a rotatable holding device with a surface of the material being exposed for viewing and another surface being used for securing the material so as to stay stationary relative to the holding device during spinning, spinning the holding device around a spinning axis, and applying the coloring agent onto the exposed surface of the material during the spinning step.

In various embodiments the coloring agent, for example, but not limited to, paint, is applied to the material through an opening in a lid member attached to a housing containing the holding device, the lid member being configured to actuate between a closed position and an open position. The lid member can be in a closed position during the applying of the coloring agent, for example, but not limited to, paint.

In various embodiments the material on which the coloring agent is applied to form a design is an article of clothing, such as, but not limited to T-shirts, skirts, caps, hats, etc.

In various embodiments the method can further include a drying step in which the coloring agent is dried using one of a UV energy source and an IR energy source positioned within, on, or adjacent the housing.

In various other embodiments, the drying step can include drying the material on a drying cord positioned outside of the spinning device or in a drying oven positioned outside of the spinning device.

DETAILED DESCRIPTION

Figure 1:
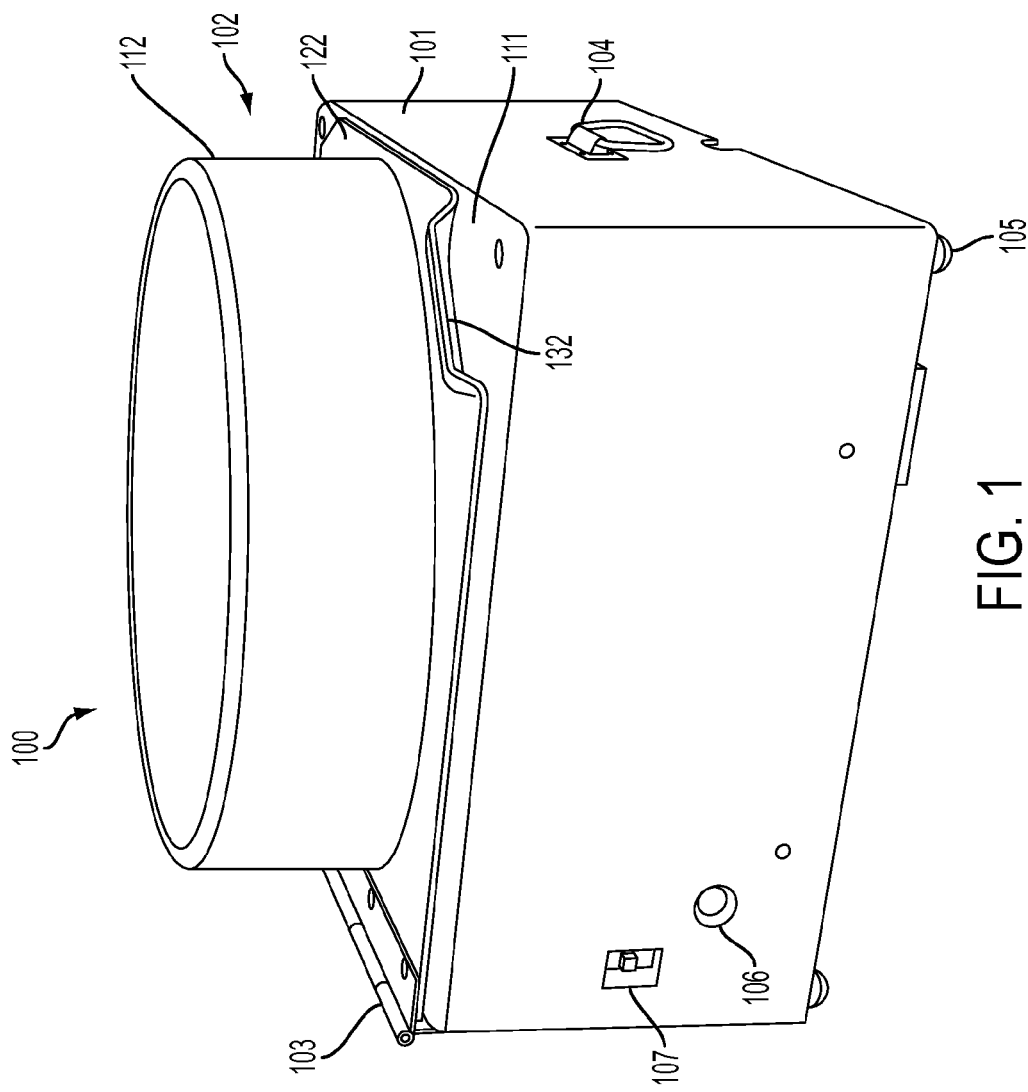
FIG. 1 is a side perspective view of a spinning assembly, in accordance with an embodiment of the invention.

FIG. 1 shows a spinning device (machine, system, assembly) 100 for creating different paint design patterns on a material, such as but not limited to, different fabrics, different canvases, etc, used for an article of clothing, such as T-shirts, caps, headgear, hats, skirts, etc. The patterns are created by applying different coloring agents onto the material while the material is being spun on a material holding device (mechanism). The coloring agent may include any flowable artistic material capable of dispersing across the material under the action of a centrifugal force generated through the rotation of the material holding device. Coloring agents may include, but are not limited to, different paints, stains, dyes, chalks, for example.

The spinning device 100 includes a housing 101 (for example, an outside cover, a casing, etc), substantially in the shape of a box (shown in more detail in FIGS. 4A-4D) attached to a frame assembly 200 (shown in FIGS. 5A-5D). The housing 101 may be made of plastic. The spinning device 100 also includes a top (upper) lid assembly 102 (shown in more detail in FIGS. 7A-7C) secured to the housing 101 along an end portion of the housing 101 by a securing means 103. The lid assembly 102 may also be pivotally secured to an upper surface 111 of the housing 101. Regardless of where secured, the lid assembly 102 can move from a closed position (shown in FIG. 1) to an open position (shown in FIG. 3). Any type of securing means 103 that allows a hinged connection between the housing 101 and the lid assembly 102 can be used. The lid assembly 102 can also be made of plastic or any other suitable material.

The lid assembly 102 includes a generally vertical portion 112 having a cylindrical shape with an aperture (opening) through its center portion, and a generally horizontal portion 122 that allows for securing the top lid assembly 102 to the upper surface 111 of the housing 101. The horizontal portion 122 includes a grip portion 132 so that a user can move the lid assembly 102 to an open position by lifting the lid assembly 102 by the grip portion 132.

The housing 101 further includes handles 104 on at least two opposing sides of the housing. The handles 104 are fastened to the housing 101 using any available and applicable fastening means and devices. A motor positioned with the housing 101 is turned on using a user-engageable switch knob 107, and the spinning operation can be commenced using a user-engageable knob 106. Leg members 105 are also attached to the housing 101 for better support. All attaching, fastening and securing means and devices disclosed can include, but are not limited to, screws, nails, bolts, spikes, pins, pegs, brackets, bearing plates, friction, and any other fastening means available for the particular application.

Figure 2:
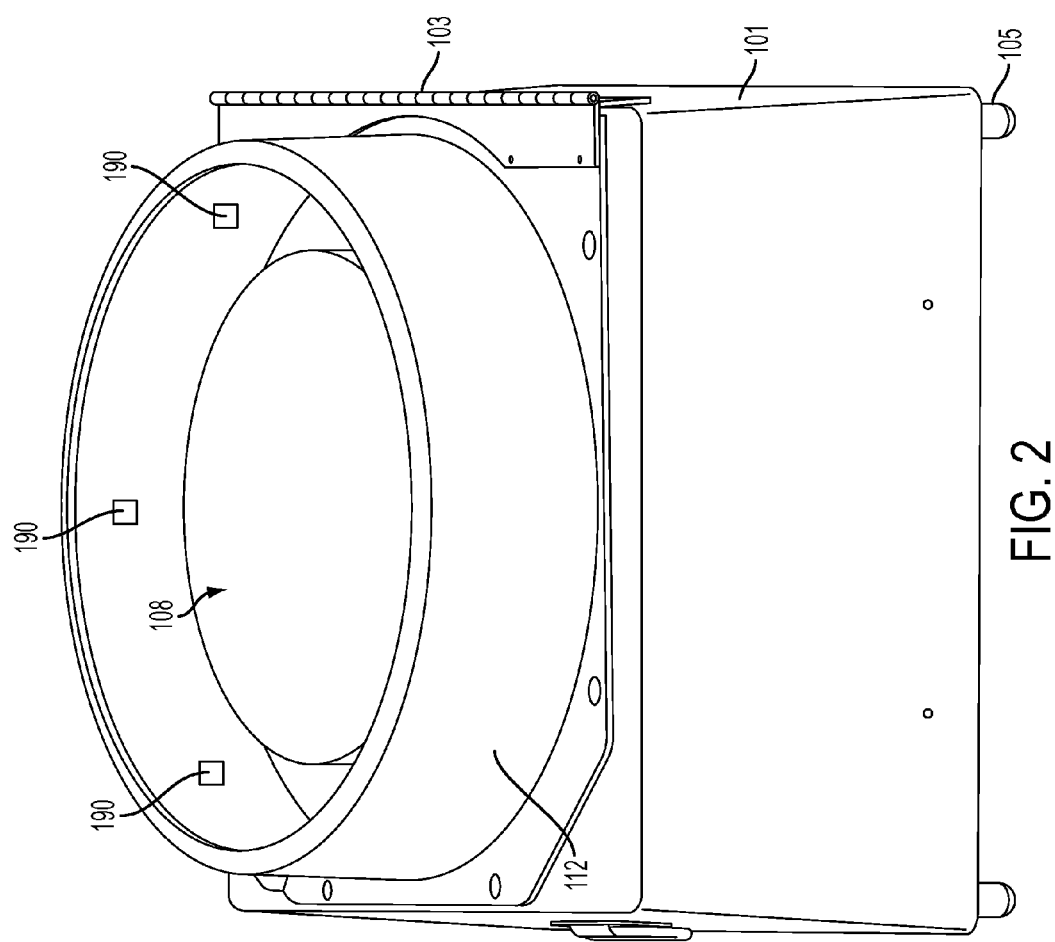
FIG. 2 is a top perspective view of a spinning assembly with fabric on a material holding device, in accordance with an embodiment of the invention.

FIG. 2 shows an opposite-side top perspective of the spinning device 100 of FIG. 1, including a material holding device 108. The material is spread out and securely held in place on the material holding device 108. The coloring agent is applied onto the material securely held in place on the material holding device 108 through an opening in the cylindrical portion 112 of the lid assembly 102 when the lid assembly 102 is in a closed position.

The spinning device 100 can also include a drying device, such as, but not limited to, one or more UV or IR light sources 190 positioned on an inner surface of the cylindrical portion 112 of the lid assembly 102 in such a way as to illuminate and dry the material after the design pattern is generated and without exposing the user to direct illumination light from the one or more UV or IR light sources 190. Other drying mechanisms, such as, but not limited to, one or more drying cords on which to hang the fabric to dry naturally, a drying oven, spin drying device, and flash drying device, can also be used to dry the material.

Figure 3:
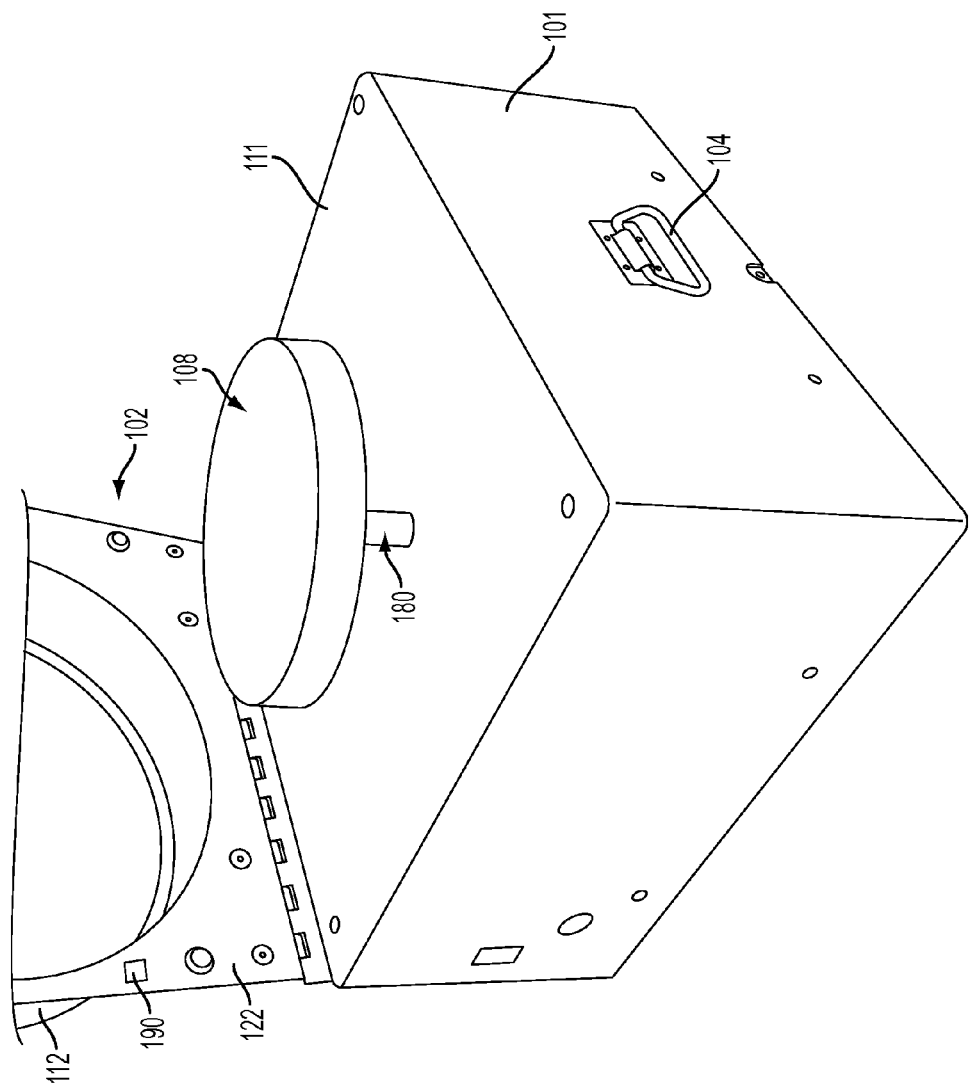
FIG. 3 is a side perspective view of the spinning assembly with the top lid open and fabric on the material holding device, in accordance with an embodiment of the invention.
Figure 4A:
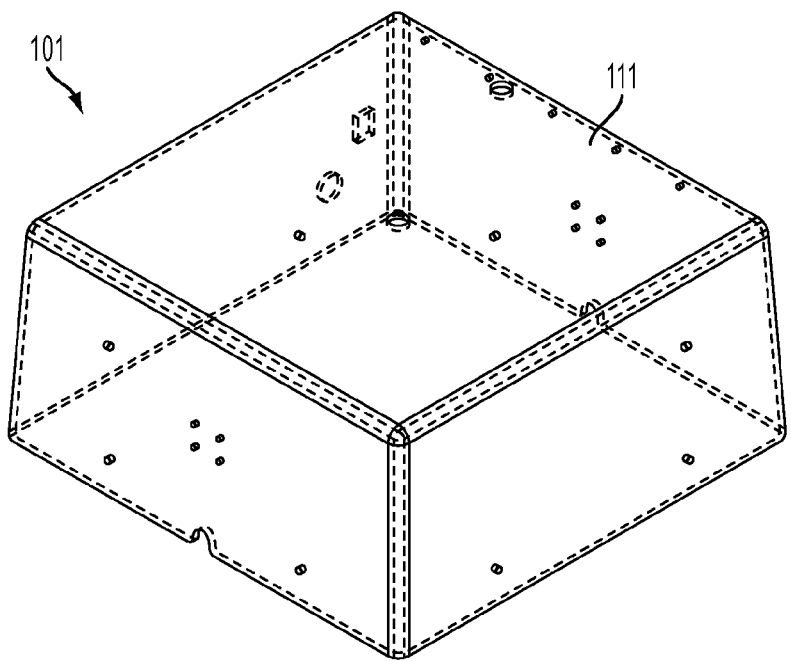
FIG. 4A is a schematic view of the outside cover for a spinning assembly, in accordance with an embodiment of the invention.
Figure 4B:
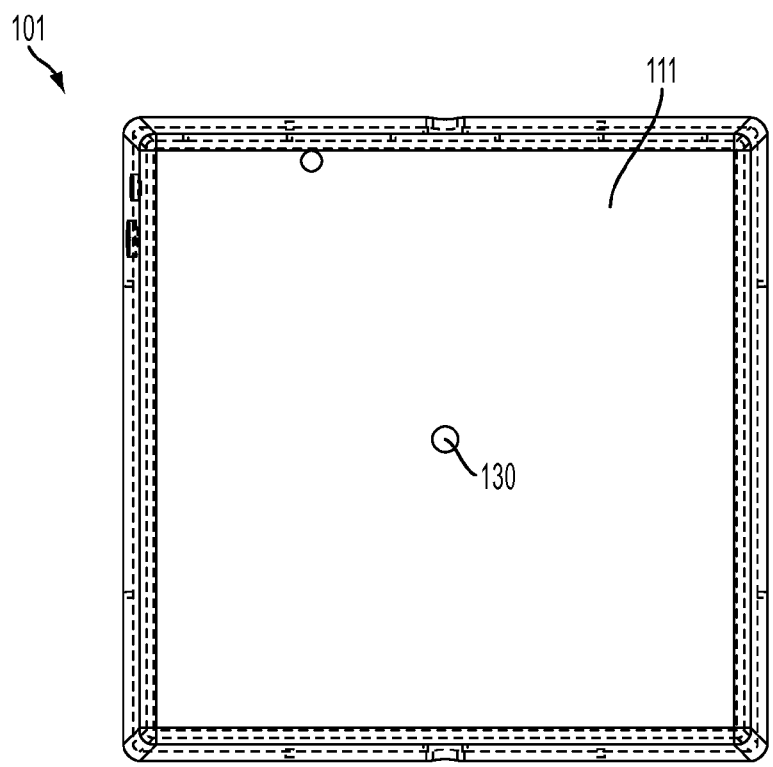
FIG. 4B is a top plan view of the spinning assembly as shown in FIG. 4A, in accordance with an embodiment of the invention.
Figure 4C:
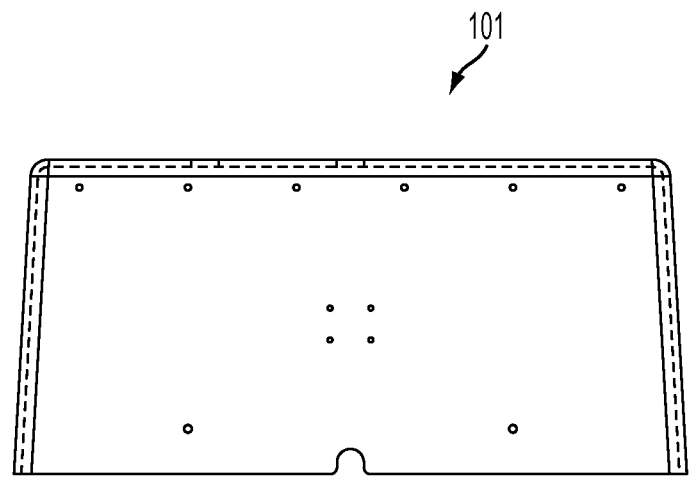
FIGS. 4C and 4D are side views of the spinning assembly as shown in FIG. 4A.
Figure 4D:
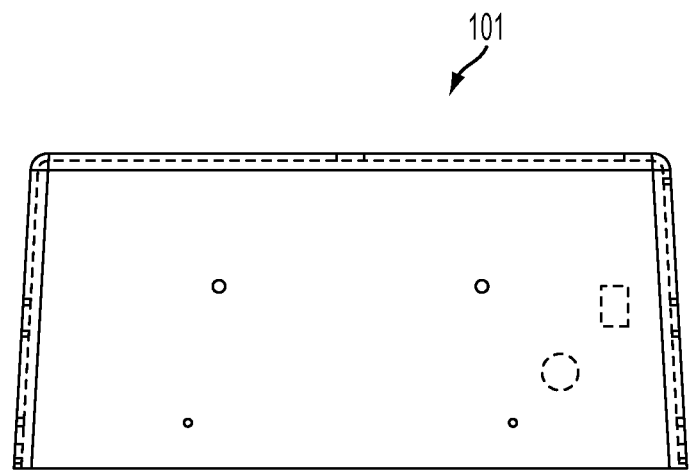

FIG. 3 shows the lid assembly 102 in an open position. When the lid assembly 102 is in an open position a user can have free access to the material holding device 108, and permit the one or more UV or IR light sources 190 that may be installed on a bottom side of the horizontal portion 122 to shine light onto the material holding device 108. This allows a user to securely fasten, remove, or reposition the material before and after the spinning process. The lid assembly 102 also functions as a paint guard to protect the user from being sprayed with paint when the spinning device 100 is in use. The housing 101 also houses a drive shaft module 300 (shown in detail in FIGS. 8A-8E), a portion of which is seen in FIG. 3, the drive shaft module 300 being connected to the material holding device 108 and is configured to rotate the material holding device 108 around a spinning axis. The spinning axis is the axis along a vertical line through the center of the drive shaft module 300.

FIGS. 4A-4D show different views of the box-like housing 101. The housing 101 includes an opening 130 located in the center portion of the top surface 111 of the housing 101 through which the drive shaft module 300 engages the material holding device 108.

The material holding device 108 is for securely holding the material in place during the spinning and can include a substantially circular plate-like platform, for example, but not limited to, a spiral plunger plate 140 (shown in more detail in FIGS. 6A-6B, FIGS. 10A-10B, and FIGS. 11A-11B), and a disc-like platform 170, such as, but not limited to, a saucer or plate (shown in more detail in FIGS. 12A-12C), the spiral plunger plate 140 and the saucer 170 being detachably attached to each other. The plunger plate 140 is also detachably attached to the drive shaft module 300. The drive shaft module 300 engages the material holding device 108 through the opening 130 located in the center portion of the upper surface 111 of the outer housing 101. The drive shaft module 300 is also connected to an AC or DC motor (not shown) of at least 1/16 HP for spinning the drive shaft. The motor is powered by a power source at about 100 V, which power source could be external to the spinning assembly (power outlet) or internal to the spinning assembly, such as a battery located inside the housing to spin the drive shaft module 300, which in turn spins the spiral plunger plate 140 and the saucer 170 at a predetermined speed of between 1-1000 rpm (rotations per minute). The motor can be activated by a user via the switch knob 107 and a user-engageable knob 106. The switch knob 107 can be a variable resistance switch that permits the user to selectively vary the speed at which the material holding device 108 is being rotated.

Figure 5A:
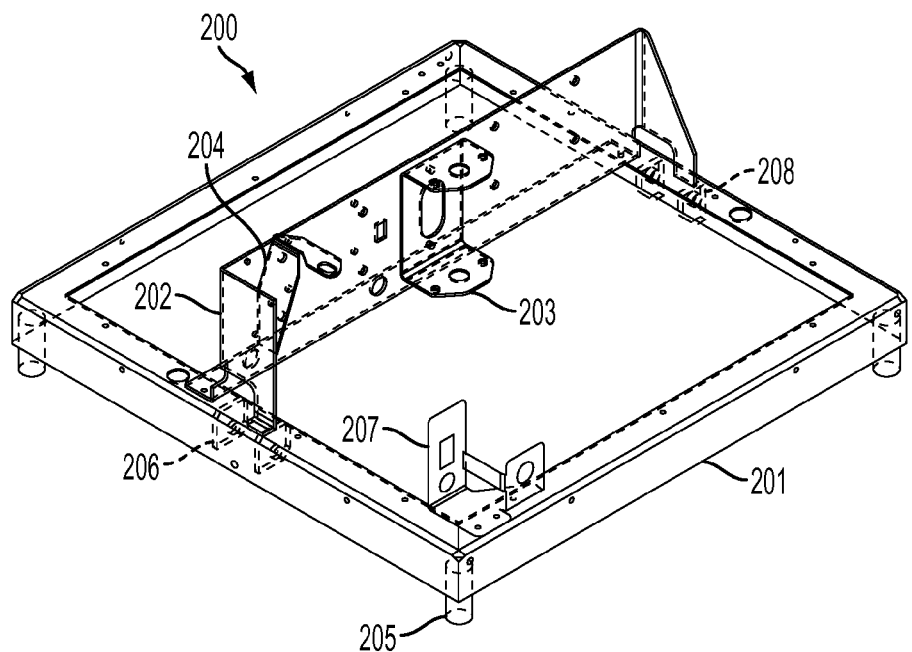
FIG. 5A is a schematic view of a base frame assembly for a spinning assembly, in accordance with an embodiment of the invention.
Figure 5B:
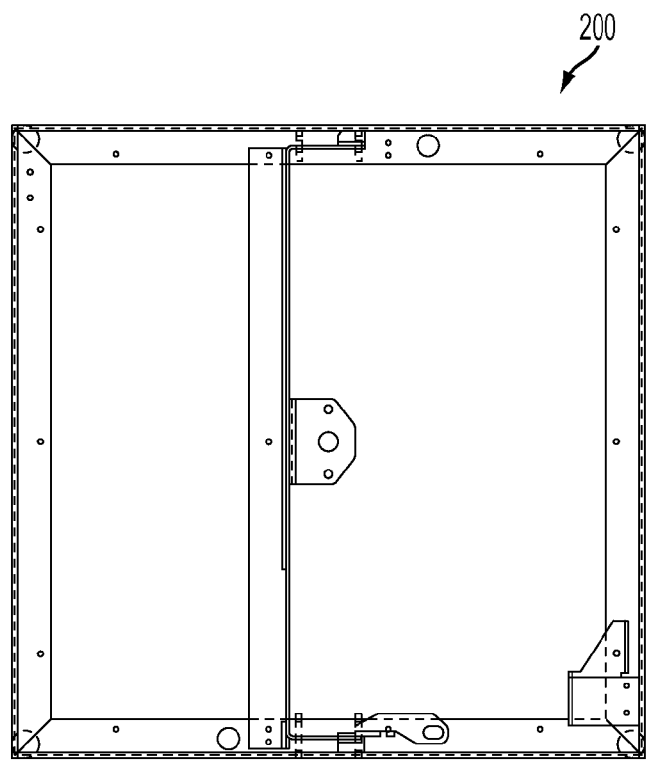
FIG. 5B is a top plan view of the base frame as shown in FIG. 5A, in accordance with an embodiment of the invention.
Figure 5C:
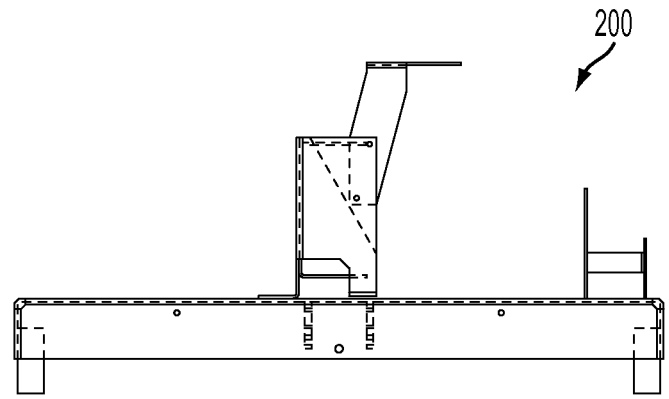
FIGS. 5C-5D are side views of the base frame as shown in FIG. 5A, in accordance with an embodiment of the invention.
Figure 5D:
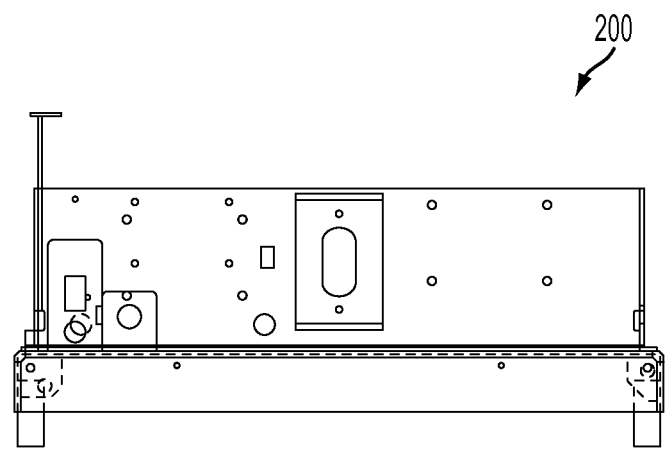
Figure 6A:
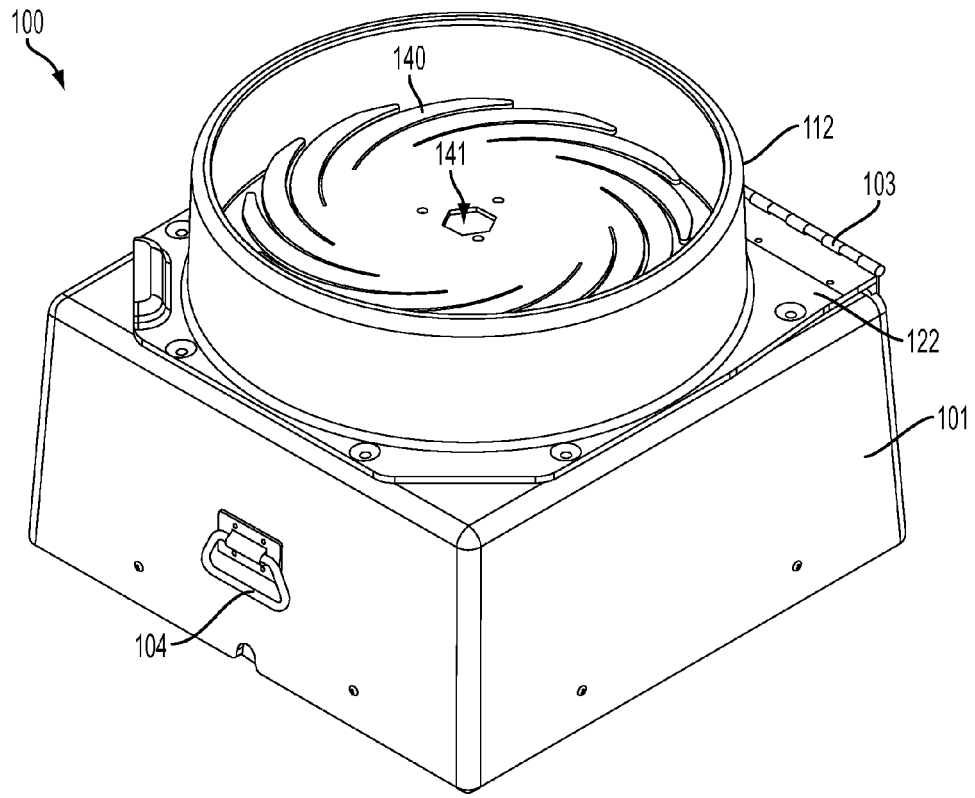
FIG. 6A is a schematic view of a spinning assembly with a spiral plunger plate, in accordance with an embodiment of the invention.
Figure 6B:
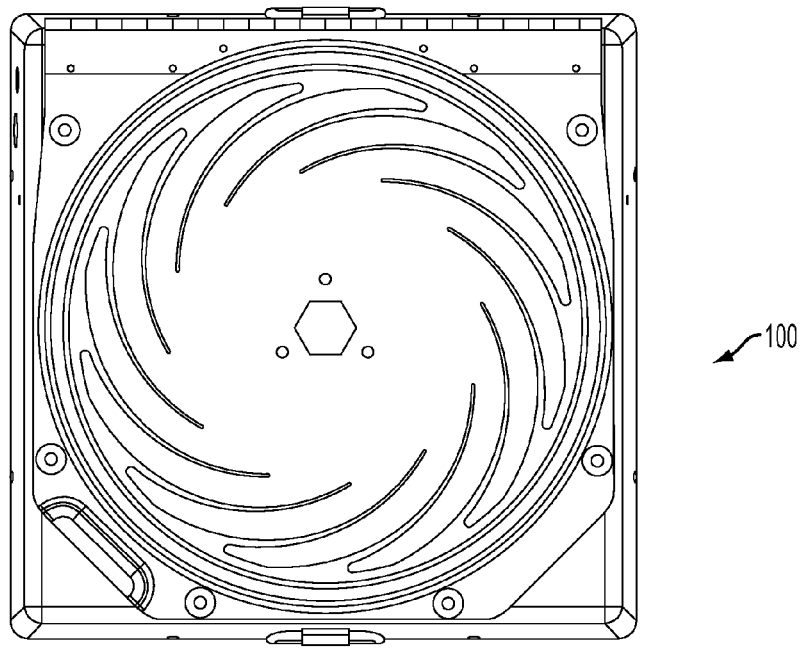
FIG. 6B is a top plan view of the spinning assembly as shown in FIG. 6A, in accordance with an embodiment of the invention.
Figure 6C:
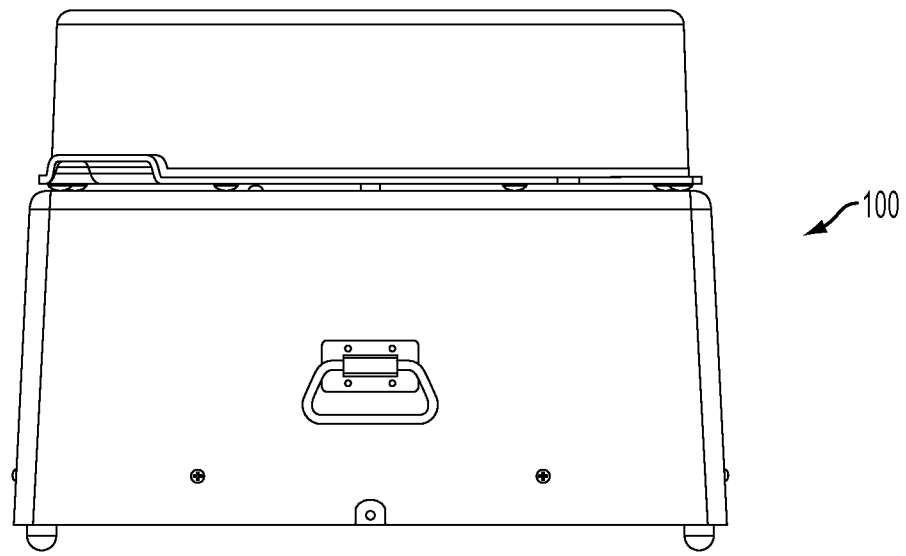
FIGS. 6C-6D are side views of the spinning assembly as shown in FIG. 6A, in accordance with an embodiment of the invention.
Figure 6D:
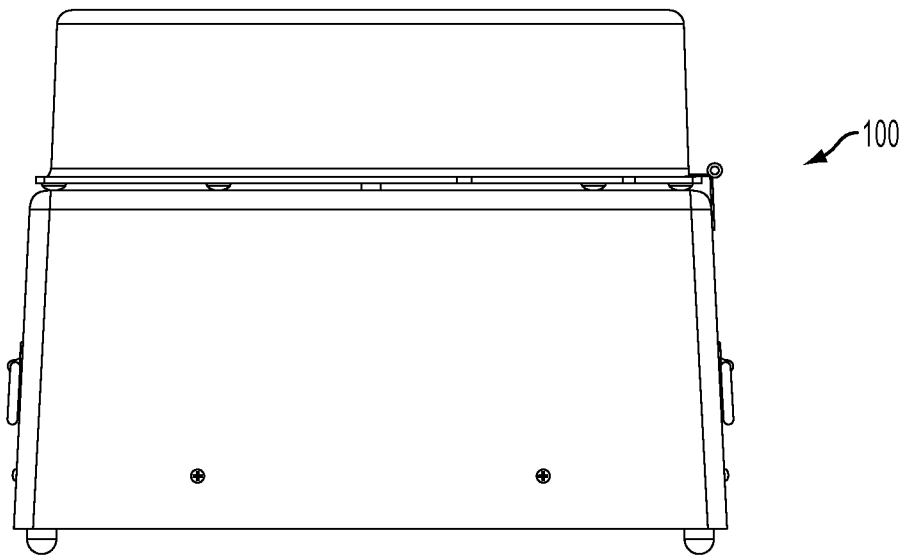

The drive shaft module 300 including is generally housed in the housing 101 and secured and fastened to the frame assembly 200, as shown in FIGS. 5A-5D. In FIGS. 5A-5A, different securing means are shown, such as, but not limited to, subframes 201, brackets 202 (backbone bracket, for example), and plates 203 (bearing plates, for example). The frame assembly 200 also includes (i.e., comprises) a support for fuse and push button 207 (to turn the spinning assembly on and off), support for tube stand-offs 205, support for a proximity switch 204, as well as leg supports 206, 208.

FIGS. 6A-6D show the spinning device 100 including a spiral plunger plate 140 mounted on the drive shaft module 300 and positioned within the generally vertical portion 112 of the lid assembly 102.

Figure 7A:
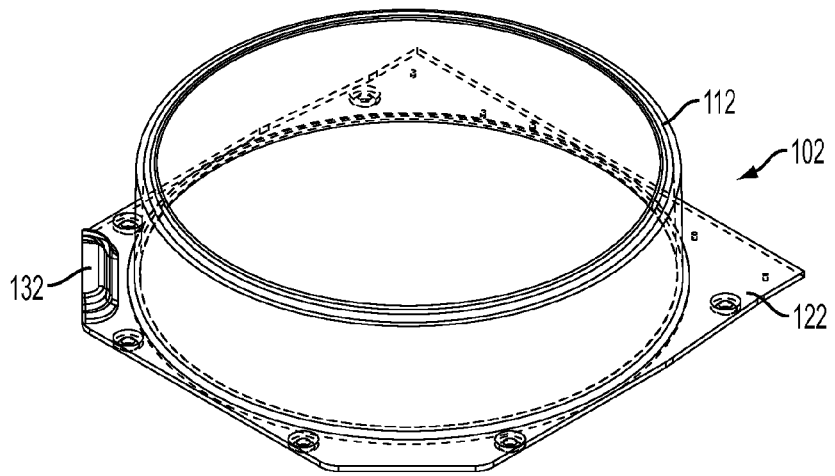
FIG. 7A is a schematic view of a top lid, in accordance with an embodiment of the invention.
Figure 7B:
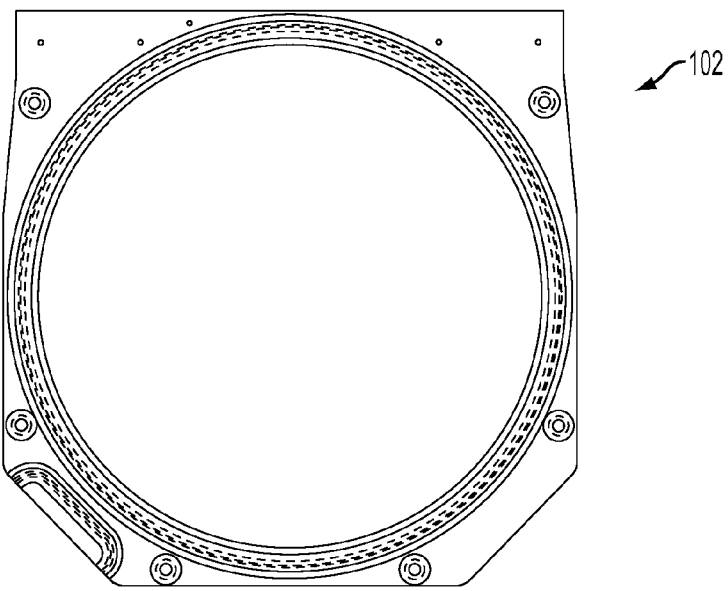
FIG. 7B is a top plan view of the top lid as shown in FIG. 7A, in accordance with an embodiment of the invention.
Figure 7C:
FIG. 7C is a side view of the top lid as shown in FIG. 7A, in accordance with an embodiment of the invention.
Figure 8A:
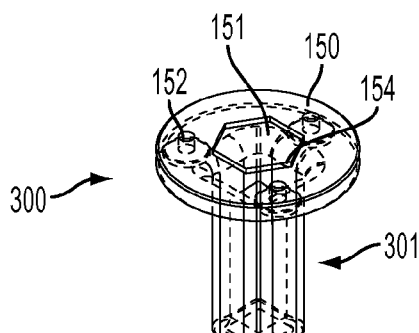
FIG. 8A is a top perspective schematic view of a drive shaft module for a spinning assembly, in accordance with an embodiment of the invention.
Figure 8B:
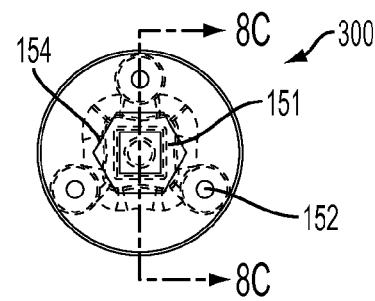
FIGS. 8B and 8E are plan views of the drive shaft module as shown in FIG. 8A, in accordance with an embodiment of the invention.
Figure 8C:
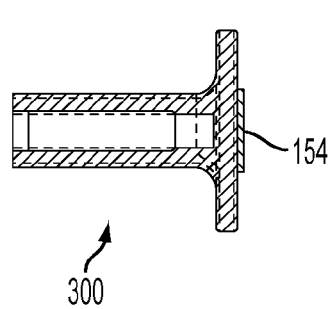
FIG. 8C is a side cross-sectional view along line A-A of the drive shaft module as shown in FIG. 8B, in accordance with an embodiment of the invention.
Figure 8D:
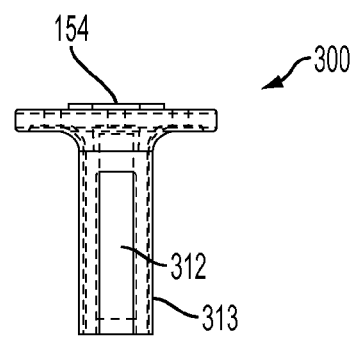
FIG. 8D is a side schematic view of the drive shaft module as shown in FIG. 8A, in accordance with an embodiment of the invention.
Figure 8E:
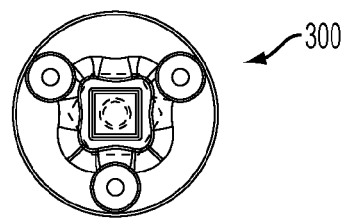

FIGS. 7A-7C show in detail the lid assembly 102 including the generally horizontal, rectangular portion 122 from which the generally vertical portion 112 having a cylindrical shape extends upwardly from a top surface of the horizontal portion 122 and defines an axially aligned open ended channel through both the horizontal and the vertical portions, 122, 112. The cylindrical portion 112 includes the axially aligned open ended channel through which the coloring agent is applied onto the material positioned on the material holding device 108. The lid assembly 102 is pivotally secured to the housing 101 at the top of a side wall and along a top edge portion of the housing 101. The coloring agent can be applied onto the material which is spread out and securely held in place on the material holding device 108 through the opening in the cylindrical portion 112 of the lid assembly 102 when the lid assembly 102 is in a closed position. When the lid 102 is in an open position, as shown in FIG. 3, a user can have access to the material holding device 108, which holds the fabric during the spinning process. The lid assembly 102 also functions as a paint guard to protect the user from being sprayed with paint when the spinning device 100 is in use.

Figures 9A, 9B:
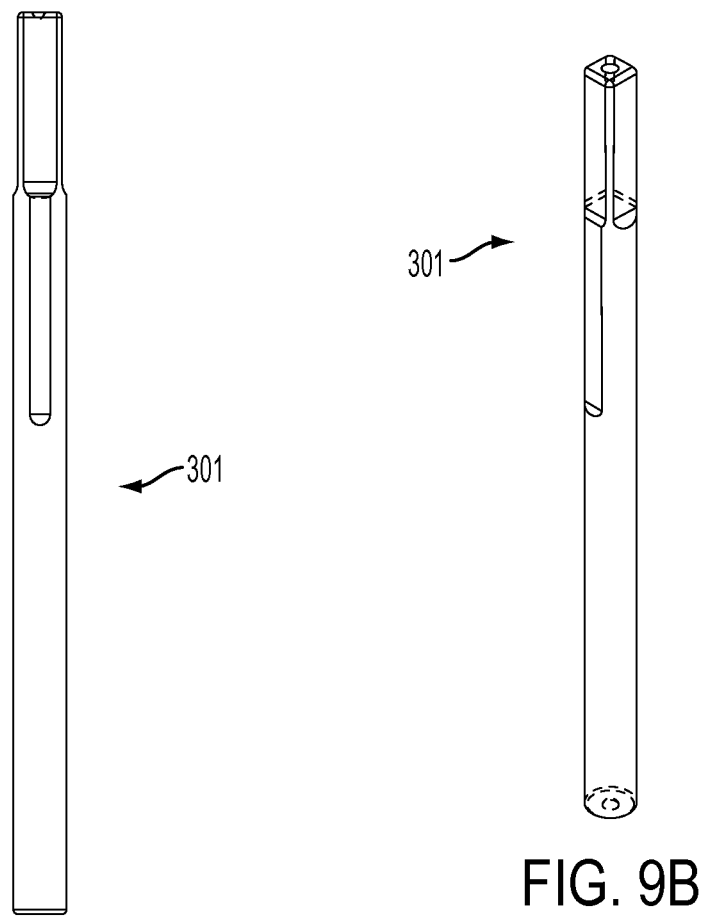
FIGS. 9A-9B are schematic views of the drive shaft that can be used in a drive shaft module as shown in FIG. 8A, in accordance with an embodiment of the invention.
Figure 10A:
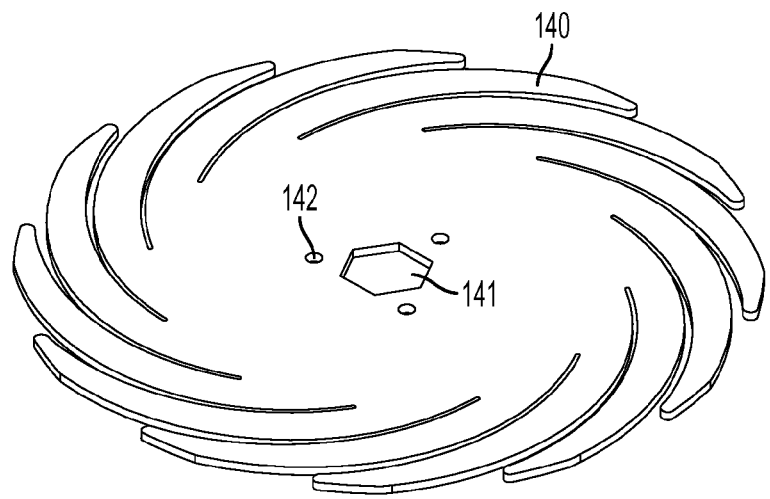
FIGS. 10A-10B are top perspective and top plan views, respectively, of spiral plunger plates that can be used in a spinning assembly, in accordance with an embodiment of the invention.
Figure 10B:
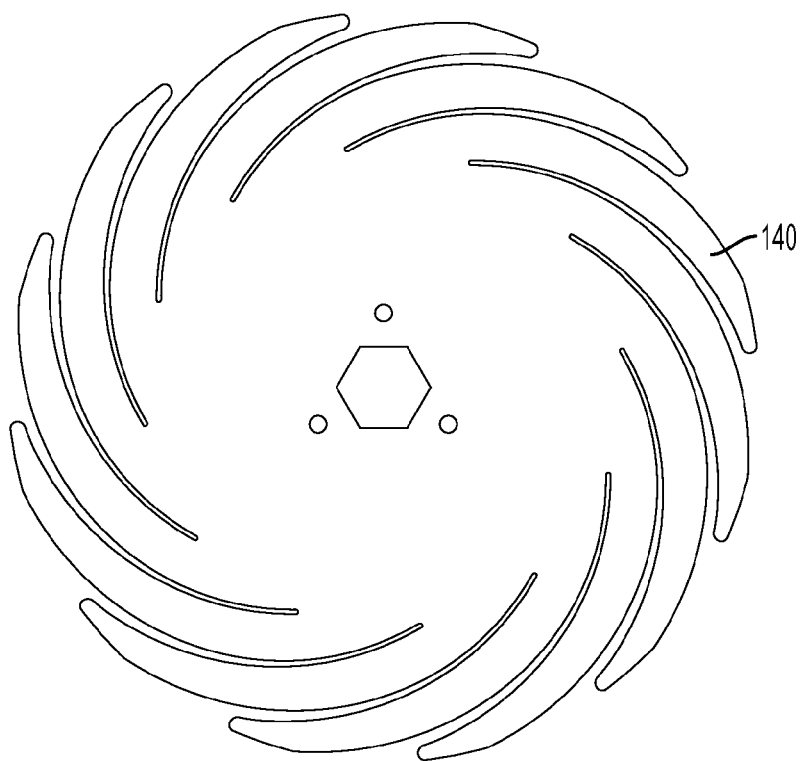

FIGS. 8A-8E show details of the drive shaft module 300 comprising a drive shaft 301 having an inner drive shaft 312 and an outer drive shaft 313 detachably attached to each other. Both drive shafts 312 and 313 can include any driving means, such as, but not limited to, beams, tubes, pipes, bores, poles, bars, rods, sticks, shanks, etc. The outer drive shaft 313 can be made of a glass filled nylon material, but any other material suitable for a drive shaft can also be used. The inner drive shaft 312 can be made of 01-Rc30 material with black oxide plating but any other material suitable for an inner drive shaft can also be used. The drive shaft 301 is connected at a top end to fastening plate 150 through a bore 151 in the fastening plate 150. The bore 151 and the top end of the drive shaft 301 can be reciprocally threaded for a secure attachment. The fastening plate 150 includes multiple fastener channels 152 through which fasteners which can be, for example, but not limited to, threaded bolts, passed to secure the drive shaft module 300 to the plunger plate 140. In FIGS. 9A-9B it is shown different views of an embodiment of the drive shaft 301 that can be used in a drive shaft module 300.

The fastening plate 150 may include a raised portion 154, which is axially aligned with the bore 151, and has an exterior shape configured to non-rotatably fit into an aperture 141 in the spiral plunger plate 140. For example, in FIGS. 8A-8D, the raised portion 154 is shown to have a hexagonal shape which non-rotatably engages the bore of spiral plunger plate 140.

Figure 11A:
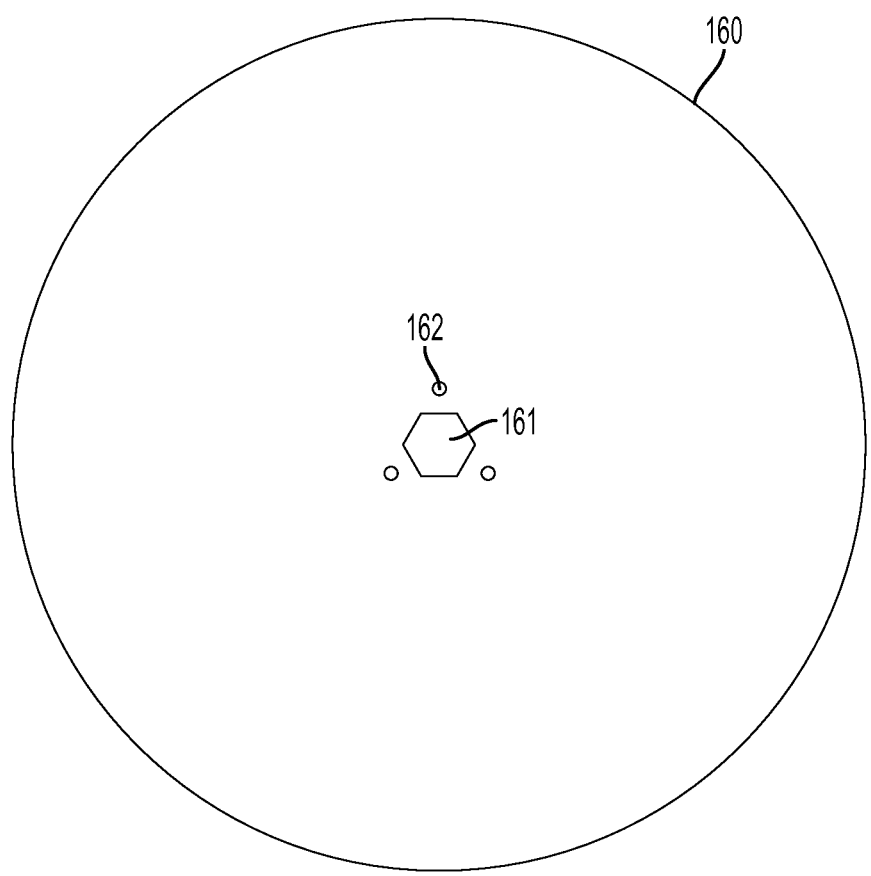
FIGS. 11A-11B are top perspective and top plan views of a round plunger plate that can be used in a spinning assembly, in accordance with an embodiment of the invention.
Figure 11B:
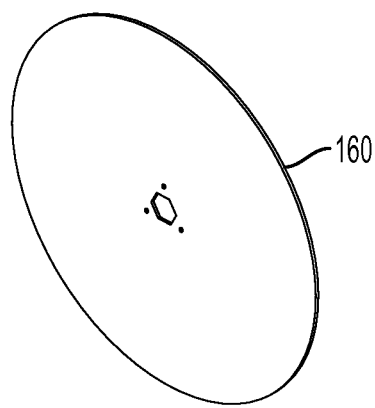

FIGS. 10A-10B and 11A-11B illustrate plunger plates having different sizes (diameter, thickness, drive shaft receiving aperture) and shapes. The spiral plunger plate 140 is shown in 10A-10B having the aperture 141 and attachment means 142 for attachment to the fastener plate 150 and its raised portion 154. A round plunger plate 160 with an inner aperture 161 and attachment means 162 for attachment to the fastener plate 150 and its raised portion 154 is shown in FIGS. 11A-11B. Spiral plunger plates having 9 inch, 12 inch, 15 inch, and 18 inch diameter, and round plunger plates with a 13.90 inch diameter can also be used, for example, depending on the size of the material to be painted.

Figure 12A:
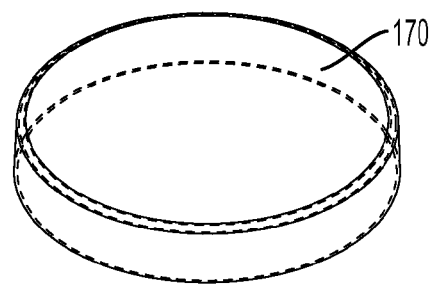
FIG. 12A is a schematic view of a platform (saucer) that can be used in a spinning assembly, in accordance with an embodiment of the invention.
Figure 12B:
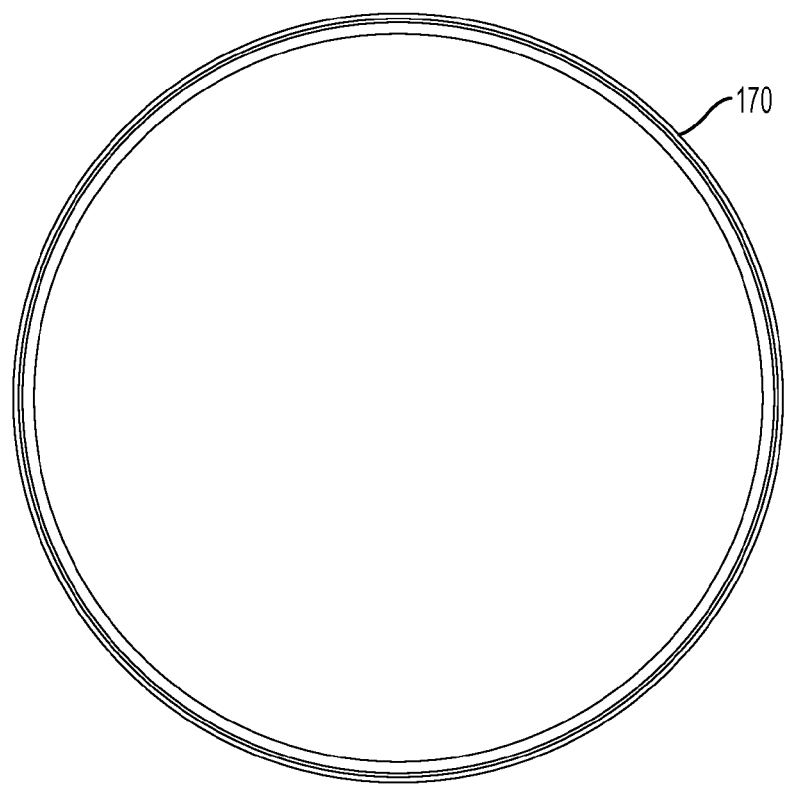
FIG. 12B is a top plan view of a platform (saucer) that can be used in a spinning assembly, in accordance with an embodiment of the invention.
Figure 12C:
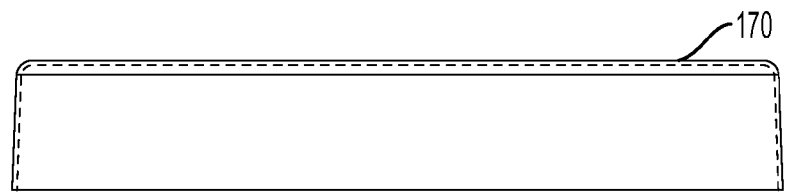
FIG. 12C is a side view of a platform (saucer) that can be used in a spinning assembly, in accordance with an embodiment of the invention.
Figure 14:
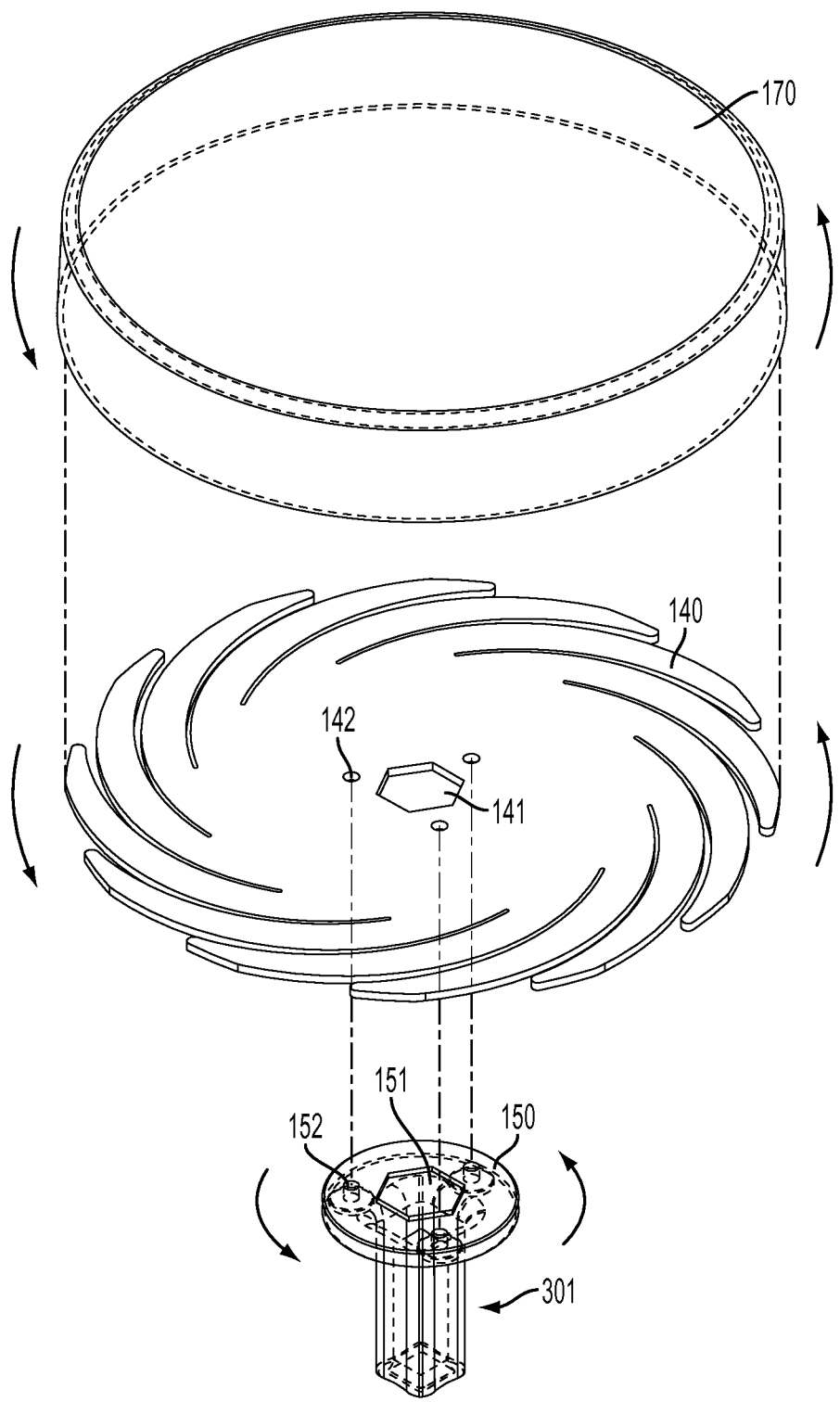
FIG. 14 is an exploded view of a drive shaft, plunger plate and a platform engaged with each other in a spinning assembly, in accordance an embodiment of the invention.

In FIGS. 12A-12C, it is shown a saucer 170, which may have a 9 inch internal diameter. However, saucers of different shapes (dimpled saucer, for example) and sizes (diameter, thickness) can also be used. Saucers 170 having 9 inch, 12 inch, and 15 inch diameters can be used, for example. FIG. 14 shows an exploded view of how the driving shaft module 300, the plunger plate 140 and the saucer 170 fit together and engage with each other.

Figure 13:
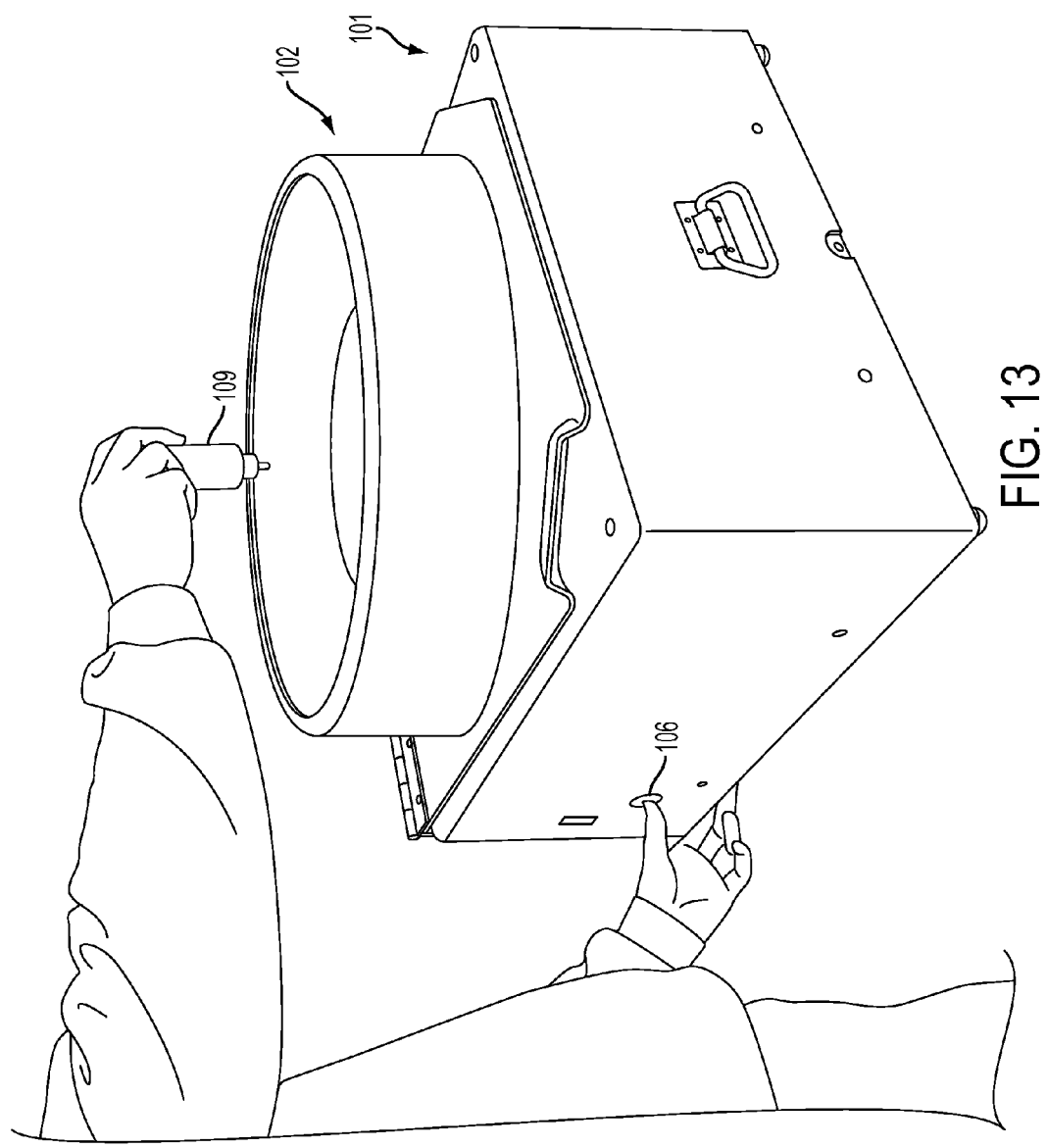
FIG. 13 is a side perspective view of a spinning assembly in operation, in accordance with an embodiment of the invention.

FIG. 13 shows the spinning device 100 in operation. Before the spinning starts, a portion of the material that will be painted is laid on a top surface of the saucer 170, and the rest of the material is securely tucked underneath the saucer 170. The material can be securely held in place on the saucer 170 using different securing means, such as, Velcro (trademark), for example, or any other securing means available for this application.

The saucer 170 is next fastened to the plunger plate 140 or 160 so that, in use, the saucer 170 and the plunger plate spin together as the material holding device 108. The plunger plate 140 can include finger-like spiral members that act like springs to clamp the material in place. The finger-like spiral elements also apply pressure to the inside of the saucer 170 to provide friction between the saucer and the plunger plate so that the saucer and the plunger plate together provide a secure holding mechanism for the material and so that the saucer and the plunger plate rotate together as one unit 108 during spinning.

A surface of the disc-like platform (saucer) includes a friction enhancing element, such as but not limited to, Velcro (trademark) strips to enhance the friction between the plate-like platform (plunger plate) and the saucer and to keep the saucer from detaching (climbing off, moving away) from the plunger plate during spinning. Various other friction enhancing elements can be used, including adding detents to the surface of the saucer, to increase friction between the saucer and the plunger plate. The fastening can be by friction, but any other suitable fastening means can be used.

Once the system is turned on by pushing the user-engageable knob 106, and the material is spinning, the user can apply different paints 109 onto the spinning material until a desired design pattern is generated. During spinning, the paint-guard/lid 102 protects the user from the splashing paint. Sheer, translucent, opaque, metallic, interference as well as pearlescent paints, acrylic paints, heat setting paints, as well as paints formulated specifically for textiles, can be used to create the spin-art. Also, any type of material, such as, cotton, muslin, silk, velvet, rayon, polyester, or any other type of fabric can be used in the spinning assembly to create the wearable art. After the desired pattern is generated, the wet material can be dried using different drying methods. The material can be allowed to dry naturally on a drying cord, or the drying process can be accelerated by applying heat to the material using a drying oven and/or a spin or flash dryer. Another way to dry the paint on the material is to turn on the IR or UV light sources 190 attached to the housing 101 or the lid assembly 102 and apply infrared (IR) and/or ultraviolet (UV) energy (light, for example) onto the material after the spinning is finished. One or more IR and/or UV light sources can be attached to a portion of the housing 101 or a portion of the lid assembly 102 so as to illuminate, and thus, cure, the material for a predetermined amount of time until the paint is completely dry. The positioning of the UV/IR light sources in the spinning assembly is such that no direct and/or reflected light is visible from the outside of the assembly. Appropriate deflecting baffles can be used to shield the light sources from paint splatter as well as to eliminate direct and/or reflected light from escaping the spinning assembly during use. The paint accumulated on the side of the paint-guard 102, can be easily removed with water or by peeling it off, for example.

Different materials, sizes, and dimensions for the housing, lid assembly, plunger plates, saucers, driving shafts, and frame assembly can be used depending on the particular application.

It is therefore, apparent that there is provided, in accordance with the present disclosure, a spinning assembly and method for creating wearable spin art. Many alternatives, modifications, and variations are enabled by the present disclosure. Features of the disclosed embodiments can be combined, rearranged, omitted, etc. within the scope of the invention to produce additional embodiments.

Furthermore, certain features of the disclosed embodiments may sometimes be used to advantage without a corresponding use of other features. Accordingly, Applicant intends to embrace all such alternatives, modifications, equivalents, and variations that are within the spirit and scope of the present disclosure.

The invention claimed is:

1. A spinning device for creating art work on a material, the spinning device comprising:
 a base including a plurality of leg members;
 a housing coupled to the base, the housing including an opening in an upper portion thereof;
 a lid assembly attached to the housing so as to be actuatable between an open position and a closed position, the lid assembly including a substantially cylindrical member; and
 a rotatable carrier member attached to the base and configured to engage, through the opening in the upper portion of the housing, a material holding device on which to mount the material, and to spin the material holding device about a spinning axis to allow a coloring agent to be applied to the material to spread under the action of a centrifugal force, the material holding device including a substantially saucer-shaped platform removably attached to a substantially plate-shaped member,
 the substantially plate-shaped member being a spiral plunger plate with a plurality of finger-shaped spiral elements curving outwardly away from a center portion of the substantially plate-shaped member,
 the saucer-shaped platform including a disk with a top surface arranged to support the material thereon during spinning of the material holding device, the platform further including a vertical wall extending from a circumferential edge of the disk toward the base,
 a radially outermost surface defined by the plurality of finger-shaped spiral elements of the spiral plunger plate facing a radially inner surface of the saucer-shaped platform defined by said vertical wall,
 a top surface of the spiral plunger plate facing a bottom surface of the disk of the saucer-shaped platform,
 the substantially cylindrical member including an open ended channel that is axially aligned with the material holding device so that the coloring agent can be applied to the material on the material holding device through the channel when the lid assembly is in the closed position.

2. The device as claimed in claim 1, wherein the lid assembly is shaped to shield a user from being splashed with the coloring agent during spinning.

3. The device as claimed in claim 1, further comprising a rotating device to rotate the carrier member.

4. The device as claimed in claim 3, wherein the rotating device includes a motor located within the housing.

5. The device as claimed in claim 4, wherein the rotatable carrier member includes a driving shaft module connected to the motor.

6. The device as claimed in claim 5, wherein the driving shaft module is further connected to the spiral plunger plate, so that the substantially saucer-shaped platform and the substantially plate-shaped member rotate as a unit during spinning.

7. The device as claimed in claim 1, further comprising a drying device to dry the coloring agent after spinning.

8. The device as claimed in claim 7, wherein the drying device includes any one of a UV energy source and an IR energy source located within or on the housing.

9. A system for creating art work on a material, the system comprising:
 a base member including a plurality of leg members;
 a housing attached to the base member, the housing including a mounting bracket on an upper surface thereof and an opening in a center portion of the upper surface;
 a lid assembly pivotably mounted to the mounting bracket and configured to be pivoted between an open position and a closed position, the lid assembly having a substantially cylindrical portion with an opening channel therethrough so as to expose a material holding device on which to mount the material when the lid assembly is in the closed position;
 a rotatable carrier member attached to the base member and configured to engage, through the opening in the upper portion of the housing, the material holding device and to spin the material holding device about a spinning axis to allow a coloring agent to be applied to the material through the opening channel in the lid assembly to spread under the action of a centrifugal force during spinning, the material holding device including a substantially circular plate-shaped platform and a substantially saucer-shaped platform,
 the substantially plate-shaped platform being a spiral plunger plate with a plurality of finger-shaped spiral elements curving outwardly away from a center portion of the substantially plate-shaped platform,
 the saucer-shaped platform including a disk with a top surface arranged to support the material thereon during spinning of the material holding device, the platform further including a vertical wall extending from a circumferential edge of the disk toward the base member,
 a radially outermost surface defined by the plurality of finger-shaped spiral elements of the spiral plunger plate facing a radially inner surface of the saucer-shaped platform defined by said vertical wall,
 a top surface of the spiral plunger plate facing a bottom surface of the disk of the saucer-shaped platform; and
 a drying device to dry the coloring agent on the material.

10. The system as claimed in claim 9, wherein the lid assembly is shaped to shield a user from being splashed with the coloring agent during spinning.

11. The system as claimed in claim 9, further comprising a rotating device to rotate the carrier member, the rotating device including a motor.

12. The system as claimed in claim 11, wherein the rotatable carrier member includes a driving shaft module connected to the motor, and a fastener plate attached to the driving shaft module, the fastener plate including a raised portion that fits into a corresponding aperture in the spiral plunger plate to support the material holding device.

13. The system as claimed in claim 9, wherein the drying device includes any one of a UV light source and an IR light source located within or on the housing.

14. An apparatus comprising:
 a housing including an opening formed in a top surface of the housing;
 a lid assembly connected to a top of the housing;
 a drive shaft extending through the opening in the top surface of the housing and engaging a motor within the housing;

a saucer-shaped platform including a disk with a support surface and a vertical wall extending from a circumferential edge of the disk toward the top surface of the housing;

a spiral plunger plate being disposed with a circumferential surface of the spiral plunger plate facing an inner surface of the vertical wall of the saucer-shaped platform and an upper surface of the spiral plunger plate facing a surface of the disk opposite to the support surface, the spiral plunger plate being rigidly connected to a top end of a drive shaft in substantially a center of the spiral plunger plate; and a plurality of leg members affixed to a bottom of the housing, wherein the spiral plunger plate includes a central portion with a plurality of fingers extending from a radially outer edge thereof, each of the fingers being curved with respect to a radial direction of the central portion and separated from circumferentially adjacent fingers by respective curved gaps, the plurality of fingers being constructed such that each finger acts as a spring that clamps a material disposed between the respective finger and the vertical wall of the saucer-shaped platform.

15. The apparatus of claim 14 further comprising:

at least one light source affixed to an inside surface of a substantially cylindrical wall of the lid assembly surrounding the opening in the top surface of the housing and extending substantially perpendicularly upwardly from the housing.

16. The apparatus of claim 15 wherein each of the plurality of finger-shaped spiral elements extend in an arcuate curve away from the center portion of the spiral plunger plate.

17. The device of claim 1, wherein each of the finger-shaped spiral elements follows a path that is curved with respect to a radial direction of the spiral plunger plate and is constructed such that the finger-shaped spiral element acts as a spring to clamp the material in place on the top surface of the saucer-shaped platform when a portion of the material is disposed between the radially inner surface of the saucer-shaped platform and a radially outer edge of the finger-shaped spiral element.

18. The device of claim 1, further comprising a friction enhancing strip disposed between and in contact with the top surface of the spiral plunger plate and the bottom surface of the disk of the saucer-shaped platform.

19. The system of claim 9, wherein each of the finger-shaped spiral elements follows a path that is curved with respect to a radial direction of the spiral plunger plate and is constructed such that the finger-shaped spiral element acts as a spring to clamp the material in place on the top surface of the saucer-shaped platform when a portion of the material is disposed between the radially inner surface of the saucer-shaped platform and a radially outer edge of the finger-shaped spiral element.

20. The system of claim 9, further comprising a friction enhancing strip disposed between and in contact with the top surface of the spiral plunger plate and the bottom surface of the disk of saucer-shaped platform.

* * * * *